United States Patent
Haines et al.

(10) Patent No.: US 9,514,055 B2
(45) Date of Patent: Dec. 6, 2016

(54) DISTRIBUTED MEDIA CACHE FOR DATA STORAGE SYSTEMS

(75) Inventors: Jonathan Williams Haines, Boulder, CO (US); Brett Alan Cook, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 890 days.

(21) Appl. No.: 12/650,921

(22) Filed: Dec. 31, 2009

(65) Prior Publication Data
US 2011/0161557 A1 Jun. 30, 2011

(51) Int. Cl.
G06F 12/08 (2016.01)
G06F 12/02 (2006.01)

(52) U.S. Cl.
CPC ....... G06F 12/0893 (2013.01); *G06F 12/0246* (2013.01)

(58) Field of Classification Search
CPC .............. G06F 12/0246; G06F 12/0873; G06F 12/0866
See application file for complete search history.

(56) References Cited

U.S. PATENT DOCUMENTS

| | | | |
|---|---|---|---|
| 4,035,778 A | 7/1977 | Ghanem | |
| 4,047,243 A | 9/1977 | Dijkstra | |
| 4,219,883 A | 8/1980 | Kobayashi et al. | |
| 4,315,312 A | 2/1982 | Schmidt | |
| 4,371,929 A | 2/1983 | Brann et al. | |
| 4,430,712 A | 2/1984 | Coulson et al. | |
| 4,493,026 A | 1/1985 | Olnowich | |
| 4,502,110 A | 2/1985 | Saito | |
| 4,905,141 A | 2/1990 | Brenza | |
| 5,357,623 A | 10/1994 | Megory-Cohen | |
| 5,592,669 A | 1/1997 | Robinson et al. | |
| 5,717,886 A | 2/1998 | Miyauchi | |
| 5,832,493 A | 11/1998 | Marshall et al. | |
| 5,940,858 A | 8/1999 | Green | |
| 6,493,800 B1 | 12/2002 | Blumrich | |
| 6,662,272 B2 | 12/2003 | Olarig et al. | |
| 7,302,592 B2 | 11/2007 | Shipton et al. | |
| 2001/0023472 A1* | 9/2001 | Kubushiro et al. | 711/103 |
| 2006/0095660 A1 | 5/2006 | Ito et al. | |
| 2007/0005894 A1 | 1/2007 | Dodge | |
| 2007/0143545 A1* | 6/2007 | Conley et al. | 711/129 |
| 2008/0147970 A1* | 6/2008 | Sade et al. | 711/113 |

OTHER PUBLICATIONS

Gleixner, Thomas et al., "UBI—Unsorted Block Images," International Business Machines Corp., 44 pages, 2006.

* cited by examiner

*Primary Examiner* — Michael Alsip
(74) *Attorney, Agent, or Firm* — Cesari & Reed, LLP; Kirk A. Cesari

(57) ABSTRACT

This disclosure is related to distributed media cache for data storage systems, such as disc drives, flash devices, or hybrid devices. In one example, a data storage device comprises a data storage medium and a controller adapted to selectively divide a media cache into a plurality of physically separate media cache portions on the data storage medium based on a physical attribute of the data storage medium and to store data received from a host system into the media cache portions.

8 Claims, 5 Drawing Sheets

DISTRIBUTED MEDIA CACHE FOR DATA STORAGE SYSTEMS

BACKGROUND

Some data storage devices include a media cache. However, many data storage devices with media cache can suffer from inefficiency due to a random workload, which may require a significant amount of computation for analysis of the workload related to the media cache contents and may require a large amount of metadata to track the media cache contents. Thus, more efficient memory designs are needed.

SUMMARY

In one embodiment, a data storage device comprises a data storage medium and a controller adapted to selectively divide a media cache into a plurality of physically separate media cache portions on the data storage medium based on a physical attribute of the data storage medium and to selectively store data received from a host system into the media cache portions.

In another embodiment, a device comprises a control circuit configured to allocate a portion of a data storage medium to a plurality of physically distinct media cache portions based on a physical attribute of the data storage medium. The control circuit may further be configured to selectively store host data in the media cache portions. In yet another embodiment, a data storage system comprises a data storage medium and means for implementing a distributed media cache.

DETAILED DESCRIPTION

Figure 1:
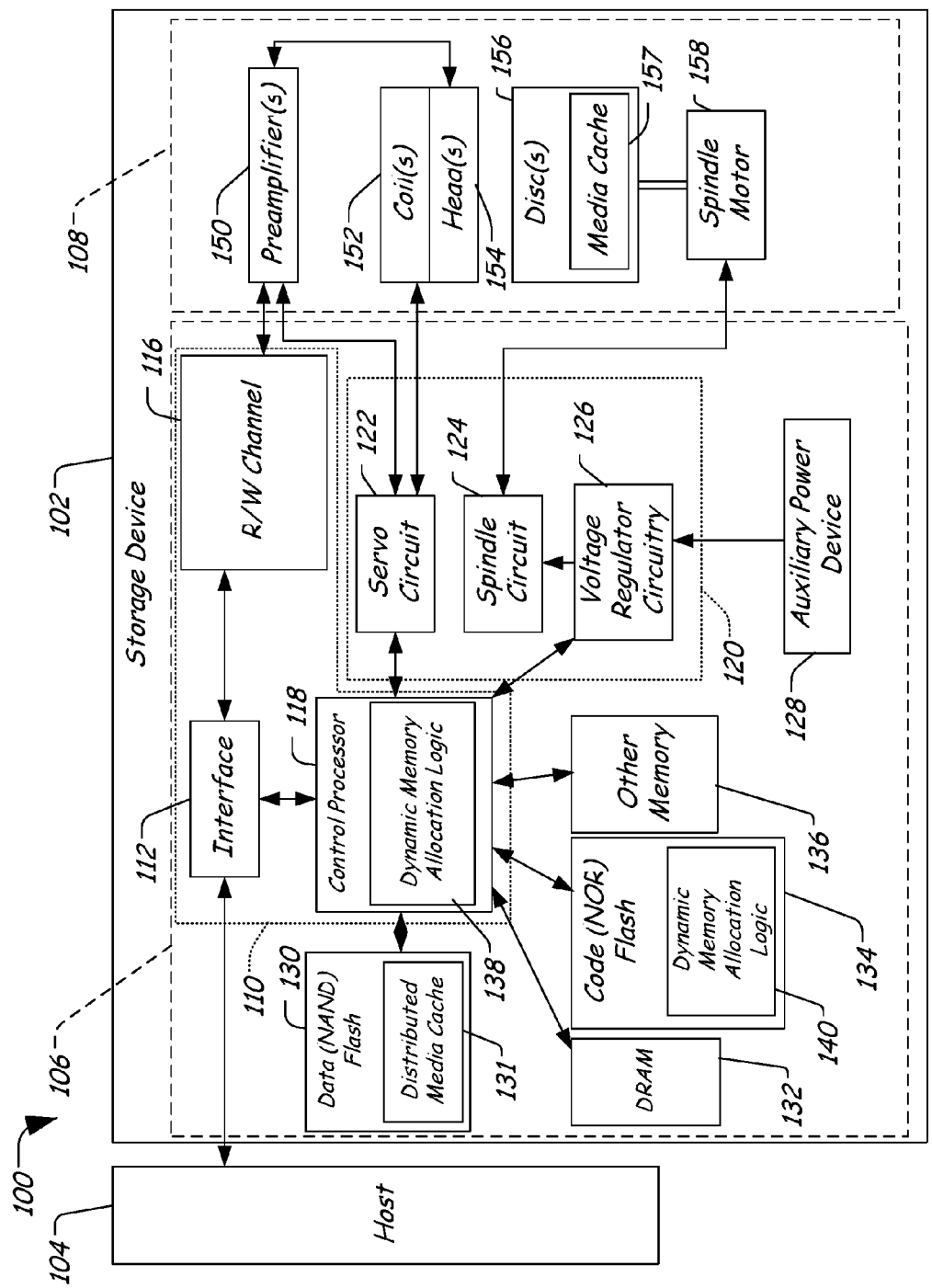
FIG. 1 is a block diagram of a particular illustrative embodiment of a data storage system including a data storage device having a distributed media cache.

As used herein, media cache is physical space on one or more non-volatile data storage media that can cache user data (logical blocks) intended for a specific logical block address (LBA) and, in so doing, supersede data of a previous physical location associated with the respective LBA. The data of the LBA in the previous physical location would have been previously stored in one of the data storage media. The media cache may be managed as a data cache and not a main store; however, the primary use of the non-volatile data storage media can be as the main store and use as media cache can be a supplemental use. For example, media cache can allow for data intended for non-sequential addresses to be stored sequentially to the media in the media cache. In some data storage devices, such as a hard disk drive, this can avoid multiple non-sequential accesses to the main store before completing a series of write commands. Thus, the amount of time needed to complete the series of write commands can be significantly reduced.

The media cache may be divided into smaller data caches, which can be distributed throughout a data storage device based on physical characteristics of the data storage media. For example, in a non-volatile data storage device having physical characteristics such as erasure blocks in a Flash memory, the media cache may be distributed based on the erasure blocks such that each erasure block contains a portion of the media cache. The portion may be a constant amount, such as three of sixty-four pages, throughout multiple erasure blocks or the portion may be variable based on differing characteristics of a media region.

In a particular embodiment, the distributed media caches may allow data intended for an arbitrary LBA to be stored in any of the distributed media caches, without regard to location of the media cache or the previous location of the data for the LBA. In another embodiment, the distributed media caches may allow data intended for a designated LBA to be cached only in a specific one of the distributed media caches associated with the physical address currently assigned to the designated LBA. For example, in an erasure block there may be sixty-four (64) pages for programming and three (3) of them may be reserved for a media cache that can be restricted to only allow caching of data already associated with the remaining sixty-one (61) pages of that particular erasure block.

In another embodiment, the distributed media cache may be distributed evenly over multiple physical areas of a data storage medium. For example, a same percentage of each erasure block may be reserved as a media cache. In yet another embodiment, the distributed media cache may be distributed unevenly over multiple physical areas of a data storage medium. In another example, the percentage of each erasure block reserved as a media cache may vary per erasure block. This variance may be based on characteristics of the erasure block such as a frequency of writing the erasure block, contents of the erasure block, a most recently used indicator, other factors, or any combination thereof.

As discussed below, by distributing the media cache, a number of advantages are realized, including front-end load-balancing, dynamically expandable media cache, reduced data size and reduced consumption of space within the data storage medium, reduced computational complexity, simplified coalescence of the cached writes, and other advantages.

Referring to FIG. 1, a block diagram of a particular illustrative embodiment of a data storage system 100 is shown and includes a hybrid data storage device 102 having a distributed media cache. As used herein, the term "hybrid data storage device" refers to a data storage device that includes at least two data storage media. In a particular example, a hybrid data storage device can include more than one type of non-volatile data storage media, such as a magnetic data storage medium and an electrically programmable and erasable solid-state storage medium. The hybrid data storage device 102 may be adapted to communicate with a host system 104 that can be a computer, a processor, a personal digital assistant (PDA), a phone, a camera, another electronic device, or any combination thereof.

The hybrid data storage device 102 can include recording subsystem circuitry 106 and a head-disc assembly 108. The recording subsystem 106 may include storage device read/write control circuitry 110 and head-disc assembly control circuitry 120. The recording subsystem circuitry 106 can include an interface circuit 112, which may include a data buffer for temporarily buffering the data and a sequencer for directing the operation of the read/write channel 116. The recording subsystem circuitry 106 may further include a preamplifier 150 on the head-disc assembly 108. The interface circuit 112 can be coupled to the host system 104 and to a control processor 118, which may be adapted to control operation of the hybrid storage device 102.

In a particular embodiment, the control processor 118 includes dynamic memory allocation logic 138 that is adapted to distribute a media cache into a plurality of media cache portions. The plurality of media cache portions can be used to store data received from the host system 104, including host data and associated media cache update data, which can be selectively allocated for storage at media cache portions that are distributed across a data storage medium or multiple storage mediums, such as a media cache 157 associated with one or more discs 156, a media cache 131 of a flash memory 130, any other media cache portion of a non-volatile buffer associated with the storage device 102, or any combination thereof. By incorporating non-volatile random access memory (RAM), pooled flash memory, and other memory to cache host data, the control processor 118 can utilize the dynamic memory allocation logic 138 to separate received data into a number of data portions, to assign the available media cache (which may be distributed across one or more data storage mediums) into a number of regions, and to distribute the received data across the number of regions.

In a particular example, the control processor 118 divides the media cache into M regions based on M physically distinct areas of the data storage medium, which may reduce the amount of metadata to analyze and reduce the number of bits to describe each entry. The control processor may use $\log_2(M)$ fewer bits of metadata to describe each entry than would be required if the media cache data were stored in a single media cache location.

The control processor 118 can be coupled to a servo circuit 122 that is adapted to control the position of one or more read/write heads 154 relative to the one or more discs 156 as part of a servo loop established by the one or more read/write heads 154. The one or more read/write heads 154 can be mounted to a rotary actuator assembly to which a coil 152 of a voice coil motor (VCM) may be attached. The VCM can include a pair of magnetic flux paths between which the coil 152 may be disposed so that the passage of current through the coil causes magnetic interaction between the coil 152 and the magnetic flux paths, resulting in the controlled rotation of the actuator assembly and the movement of the one or more heads 154 relative to the surfaces of the one or more discs 156. The servo circuit 122 can be used to control the application of current to the coil 152, and hence the position of the heads 154 with respect to the tracks of the one or more discs 156.

In a particular embodiment, the head-disc assembly control circuitry 120 can include the servo circuit 122 and a spindle circuit 126 that is coupled to a spindle motor 158 to control the rotation of the one or more discs 156. The hybrid storage device 102 can also include an auxiliary power device 128 that is coupled to the head-disc assembly control circuitry 120 and that is adapted to operate as a power source when power to the hybrid storage device 102 is lost. In a particular embodiment, the auxiliary power device 128 can be a capacitor or a battery that is adapted to supply power to the hybrid storage device 102 under certain operating conditions. In a particular example, the auxiliary power device 128 can provide a power supply to the recording subsystem assembly 106 and to the head-disc assembly 108 to record data to the one or more discs 156 when power is turned off. Further, the auxiliary power device 128 may supply power to the recording subsystem assembly 106 to record data to a data flash 130, such as a NAND or NOR flash data storage medium, or to another flash memory, such as a code (NOR) flash 134 when power is turned off.

Additionally, the hybrid storage device 102 includes the data flash 130, a dynamic random access memory (DRAM) 132, the code flash 134, other memory 136, or any combination thereof. In a particular embodiment, the code flash 134 can store dynamic memory allocation logic instructions 140, which can be loaded and executed by the control processor 118. In a particular embodiment, the data flash 130 may store a logical block address (LBA) lookup table in addition to storing a portion of the media cache 131.

The control processor 118 may execute the dynamic memory allocation logic to determine an available media cache capacity from the media cache, including the media cache 157 and the distributed media cache 131. The control processor 118 can also be adapted to divide the available media cache capacity into a number of media cache portions and assign the portions to particular physical portions of one or more data storage mediums.

Rather than have a single media cache, the control processor 118 of the data storage device 102 can utilize available memory capacity of the solid-state data storage media, such as the data flash 130, the code flash 134, the other memory 136, a non-volatile buffer of the interface, other memory, or any combination thereof to provide a distributed media cache. In one example, each of the media cache regions or devices can be made available in an evenly distributed fashion, where each 1/N of the data storage media receives 1/N of the media cache resource. For instance, each erasure block may reserve a same number of pages within the erasure block as media cache; thus, a same percentage of each erasure block is reserved as media cache. In a second example, each of the media cache regions can be made available in an unevenly distributed fashion, where some regions have more media cache resources while other regions have less media cache regions. Distribution of an unevenly based media cache may be determined based on characteristics of the data storage medium. Also, alternatively or in addition, distribution of media cache may be based on host workload characteristics. For example, very infrequently-updated data could be put into sections of physical media for which very little (or zero) media cache is allocated, whereas frequently-updated data may be put into section of physical media having more media cache.

In a particular embodiment, the received data can be stored in logical erasure blocks (LEBs), which can be organized or grouped into a virtual erasure block (VEB). The VEBs can correspond to a set of physical erasure bocks (EB). An LEB can correspond to a set of LBAs. The VEBs can be formatted to contain a non-cache portion and a media cache portion to be used for "update data" for LBAs that the host device 104 has written since the last time that the VEBs' non-cache portion was written.

By dividing and distributing the media cache, fewer possible disc media addresses are possible in the media cache 157. Thus, some space can be saved per media cache descriptor. Further, if the one or more discs 156 were replaced with a solid-state data storage medium, space savings for the media cache descriptor can still be realized.

Additionally, the control processor 118 can utilize an algorithm to coalesce an EB's host data portion and the media cache portion when the contents of the LEB are to be copied to a new VEB. When the data is to be copied, the control processor 118 can utilize the dynamic memory allocation logic 138 to collect overrides (the newer data stored in the media cache portion) for the particular erasure block and to combine the overrides with the host data in the new VEB.

Further, in some embodiments where a media cache portion is restricted to store specific LBAs based on a physical characteristic such as an erasure block, the amount of data that needs to be analyzed each time the data storage medium is accessed may be reduced to a fraction of the whole media cache because the media cache portion associated with any one specific LBA may be much smaller than the media cache as a whole. Further, the distributed media cache inherently has a fractionally-limited "worst case" penalty for flushing to a main store, such as the one or more discs 156 or to a solid-state data storage medium, due to a size of data storage attributed to media cache that corresponds to a specific portion of a data storage medium.

In an embodiment where the control processor 118 operates LEBs and VEBs, the LEBs may be hard-wired together in pairs, where one holds the upper byte of every 16 bits of data, and the other holds the lower byte of every 16 bits. Such "hard-wired" LEBs can be referred to as logical dual erasure blocks (LDEB). It should be understood that the upper/lower byte relationship is provided as a representative example, but is not intended to be limiting. An LEB corresponds to a set of LBAs that are mapped to a VEB. Since the LEB is logical, the LEB can be thought of as containing a single copy of each LBA that was mapped to it. In a particular example, once a VEB address is found in an LBA-to-LEB mapping, followed by an LEB-to-VEB lookup table, then the location of the data in the VEB is the same as that in the LEB, unless there has been an override in that VEB for the particular LBA. In a particular embodiment, the VEB includes an override portion to store data related to a state (or status) of LBAs associated with the VEB.

Figure 2:
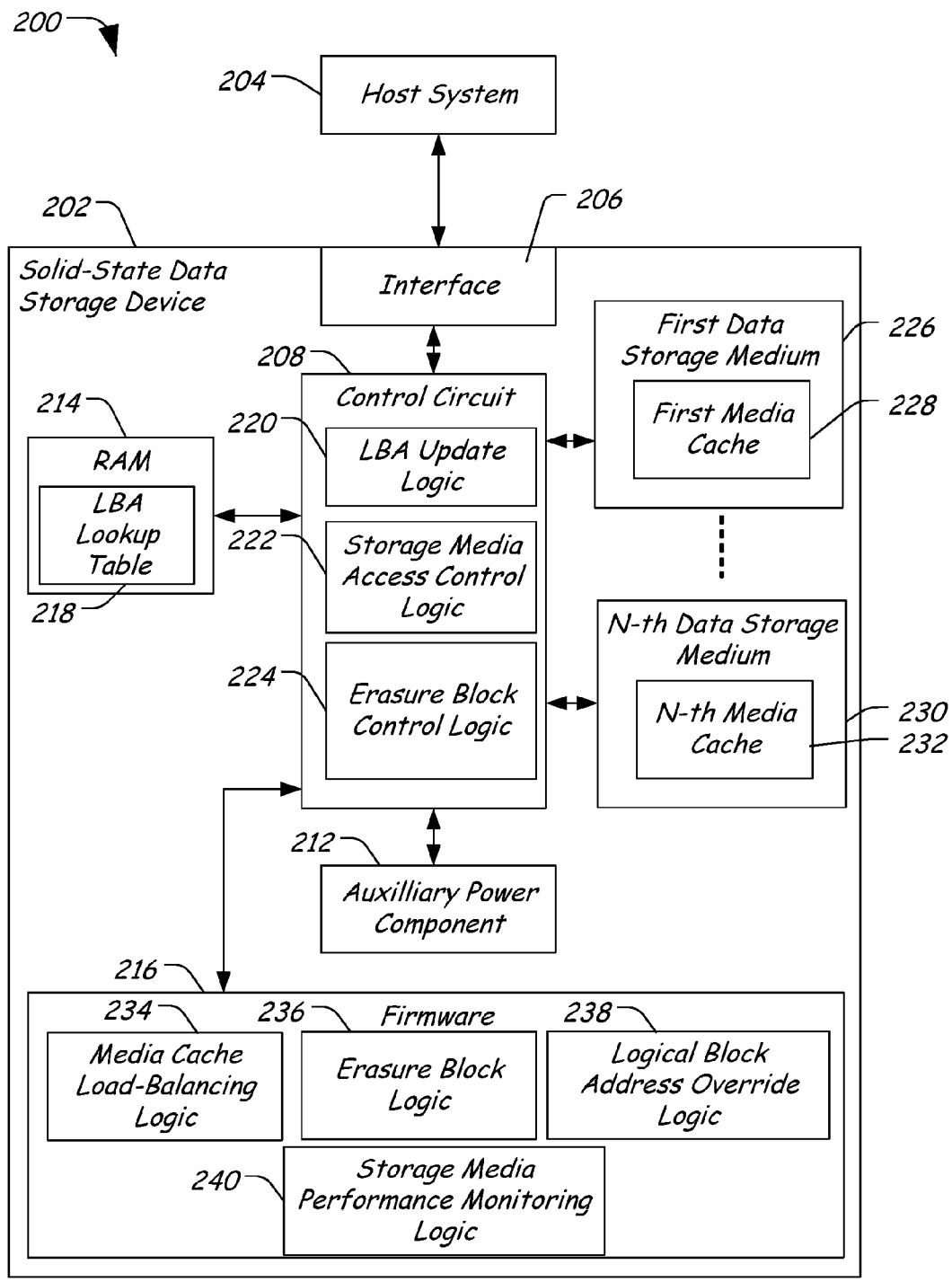
FIG. 2 is a block diagram of a second particular illustrative embodiment of a data storage system including a data storage device having a distributed media cache.

FIG. 2 is a block diagram of a second particular illustrative embodiment of a data storage system 200 including a data storage device 202 having a distributed media cache. In a particular embodiment, the data storage device 202 can be a solid-state data storage device, including multiple solid-state data storage media. The data storage device 202 can be adapted to communicate with a host system 204. In a particular example, the data storage device 202 can be integrated within the host system 204. In another particular example, the data storage device 202 can communicate with the host system 204 via a data storage bus. The host system 204 may be a computer, a portable device (such as a portable computer, a mobile telephone, a personal digital assistant), a digital video recorder (DVR), another electronic device, or any combination thereof.

The data storage device 202 can include an interface 206 adapted to couple to a bus to facilitate communications with the host system 204. Further, the data storage device 202 includes a control circuit 208 (which may include a processor) that can be coupled to the interface 206 and that can be adapted to control selective distribution of data received via the interface 206 to at least one of a random access memory 214, a first data storage medium, 226, and an N-th data storage medium 230. It should be understood that the data storage device 202 can include any number or any type of data storage media, depending on the particular implementation. The data storage device 202 further can include power circuitry including an auxiliary power component 212 (such as a rechargeable battery, a capacitor, or another auxiliary power component) to provide a power supply to the data storage device 202 when a primary power source is unavailable. Further, the data storage device 202 includes firmware 216, which is adapted to store instructions that are executable by the control circuit 208.

In a particular embodiment, the firmware 216 includes media cache load-balancing logic 234 that is executable by the control circuit 208 to selectively store media cache data, including user data and associated metadata, in a distributed manner. In a particular example, the first data storage medium 226 may include a first media cache 228 and the N-th data storage medium 230 includes an N-th media cache 232. The media cache load-balancing logic 234 defines at least one algorithm for selectively storing portions of the media data at the first through N-th media caches 228 and 232 to balance write-induced wear across the various data storage media 226 and 230. Further, the media cache load-balancing logic 234 can be adapted to perform background scans and other background activity to retrieve bookkeeping information to identify pages that have a high likelihood of frequent change or of suffering from read- or write-disturbances. The media cache load-balancing logic 234 can be used to check the readability of such identified pages and to move the data to another region if the data is degraded.

The firmware 216 further can include erasure block logic 236 that is executable by the control circuit 208 to produce logical erasure blocks (LEBs) and to group the LEBs into virtual erasure blocks (VEBs). In a particular embodiment, the erasure block logic 236 is adapted to stripe VEBs across the multiple media caches 228 to 232, balancing the load across the multiple data storage media 226 and 230. Load-balancing the erasure blocks can ensure that no particular region of the data storage media (such as the first and N-th data storage media 226 and 230) is over-erased or over-written as compared to other regions. The firmware 216 further can include LBA override logic 238 that is executable by the control circuit 208 to selectively generate LBA override information. When the content of a particular erasure block is to be copied to a new set of LEBs, the LBA override logic 238 may be adapted to collect all overrides for the existing set of LBAs and to collapse the collected overrides into non-override data in the new set of LEBs.

In a particular embodiment, the LBA override logic 238 can generate LBA override descriptors, which can be stored with each datum written into the override pages of a particular VEB. In this instance, possible override spaces can be scanned by the control circuit 208 after unexpected power loss to reconstruct the state of the data storage media, including the first and N-th data storage devices 226 and 230. In a particular example, each subsection's override descriptors are scanned upon first access of the data storage media 226 and 230 after unexpected power loss. The LBA override descriptors may be generated by the LBA override logic 238 periodically as a whole set of descriptors, then as incremental descriptors in the override area, making scanning after unexpected power loss much less onerous. The firmware 216 may also include storage media performance monitoring logic 240 to monitor data errors, such as read retry rates, bit error rates, and other data errors. The data errors may be utilized by the control circuit 208 to identify portions of the data storage media 226 and 230 that may be degrading.

The RAM 214 may include a logical block address (LBA) lookup table 218. The control circuit 208 may include LBA update logic 220 to update the LBA lookup table 218 responsive to changes in the stored data and to update LBA data both in the LEBs and VEBs stored in the media cache 228 and 232. Further, the control circuit 208 may include storage media access control logic 222 to control access to the data storage media 226 and 230. Additionally, the control circuit 208 can include erasure block control logic 224, which can be adapted to group logical erasure blocks (LEBs) into virtual erasure blocks (VEBs). Each VEB includes at least one LEB. The first data storage medium 226 may include a first media cache 228 and the N-th data storage medium 230 can include an N-th media cache 232. It should be understood that the media cache, in this particular embodiment, is distributed across the data storage media 226 and 230, which may include any number of data storage media. The erasure blocks are distributed across the distributed media caches 228 and 232. In a particular embodiment, the erasure block filling and subsequent erasing can be used to replace a traditional media cache, such as when a projection on a particular VEB due to the size of the host writes approaches the size of a LEB. In a particular example, the erasure block control logic 224 may use idle time of the data storage device 202 to monitor wear of the data storage media 226 and 230 to find EBs that would benefit from having redundant information (e.g. parity codes, error detection and correction codes) saved in their override area, so that hardware automation could be used to minimize latency by fetching the override data for a target VEB while the control circuit 208 otherwise is performing volatile cache lookups or other operations.

Figure 3:
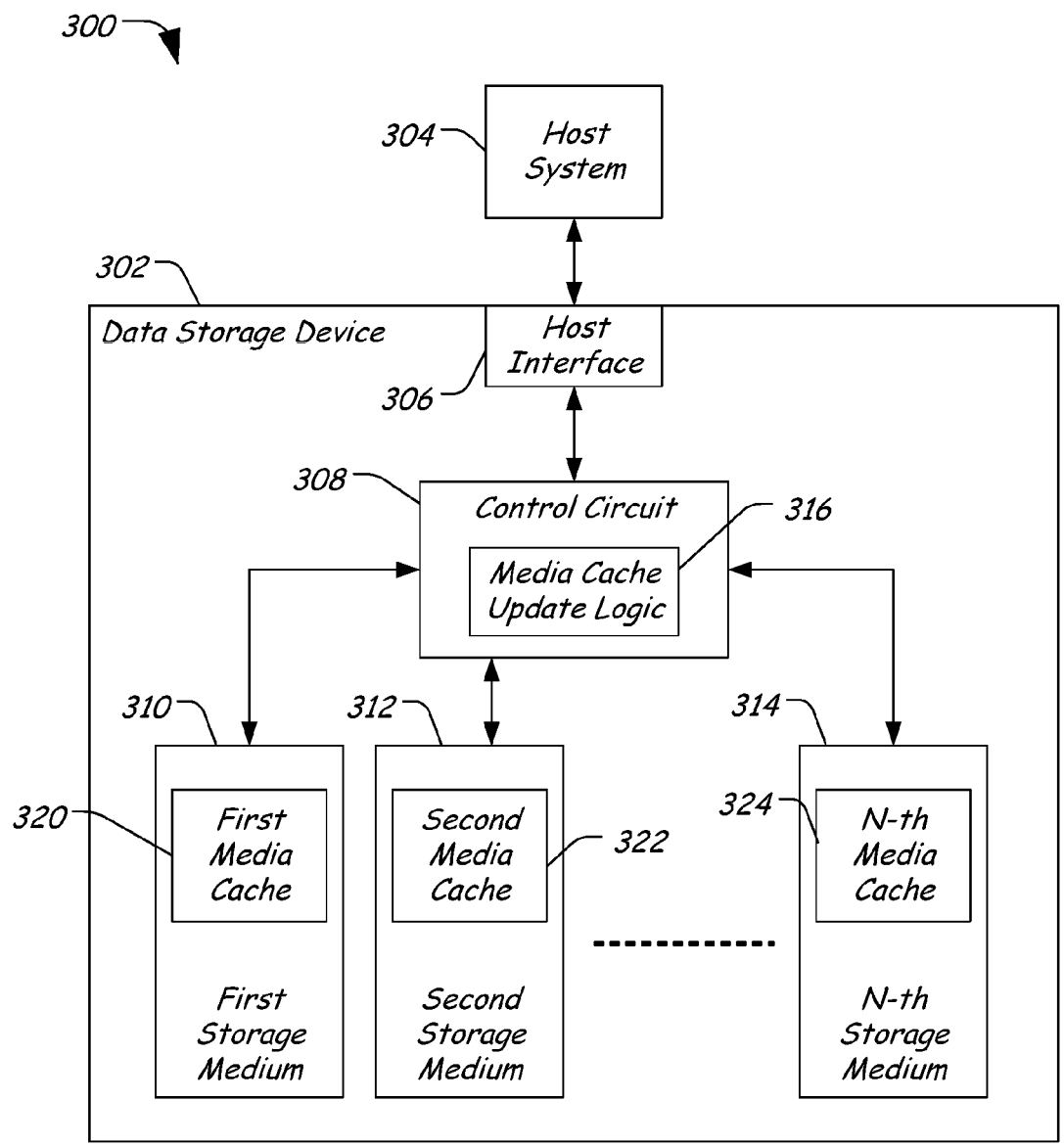
FIG. 3 is a block diagram of a third particular illustrative embodiment of a data storage system including a data storage device having a distributed media cache.

FIG. 3 is a block diagram of a third particular illustrative embodiment of a data storage system 300 including a data storage device 302 having a distributed incremental-update cache. The data storage device 302 is adapted to communicate with a host system, such as the host systems 104 and 204 described and illustrated with respect to FIGS. 1 and 2. The data storage device 302 can include a host interface 306 that is responsive to the host system 304 to receive data including host data and associated media cache update data and to communicate data to the host system 304. The data storage device 302 can further include a control circuit 308 that is coupled to the host interface 306. The control circuit 308 may include media cache update logic 316 that is adapted to selectively store portions of the received data in erasure blocks at a first media cache 320 of a first data storage medium 310, a second media cache 322 of a second data storage medium, and an N-th media cache 324 of an N-th data storage medium 314.

In a particular embodiment, the media cache update logic 316 can be adapted to utilize available media cache space. In a particular example, when data is received from the host system 304 via the host interface 306, the media cache update logic 316 may be adapted to segment the received data into data portions and to distribute the data portions across the first, second and N-th data storage media 310, 312, and 314 in a distributed fashion In a particular example, the data portions may be written into LEBs of a VEB, such that the erasure block filling and subsequent erasing can be used to replace a traditional media cache. Each of the LEBs can be formatted to contain host data (including user data) and "update data" or override storage for LBAs that the host system 304 has written since the last time that the EB's non-update data was written. In a particular embodiment, the media cache update logic 316 may be adapted to collect overrides for the particular erasure block set and to combine the overrides into non-override data when the VEB is moved to a new EB. Each VEB may have one of many possible configurations for the amount of override storage versus user data storage.

Figure 4:
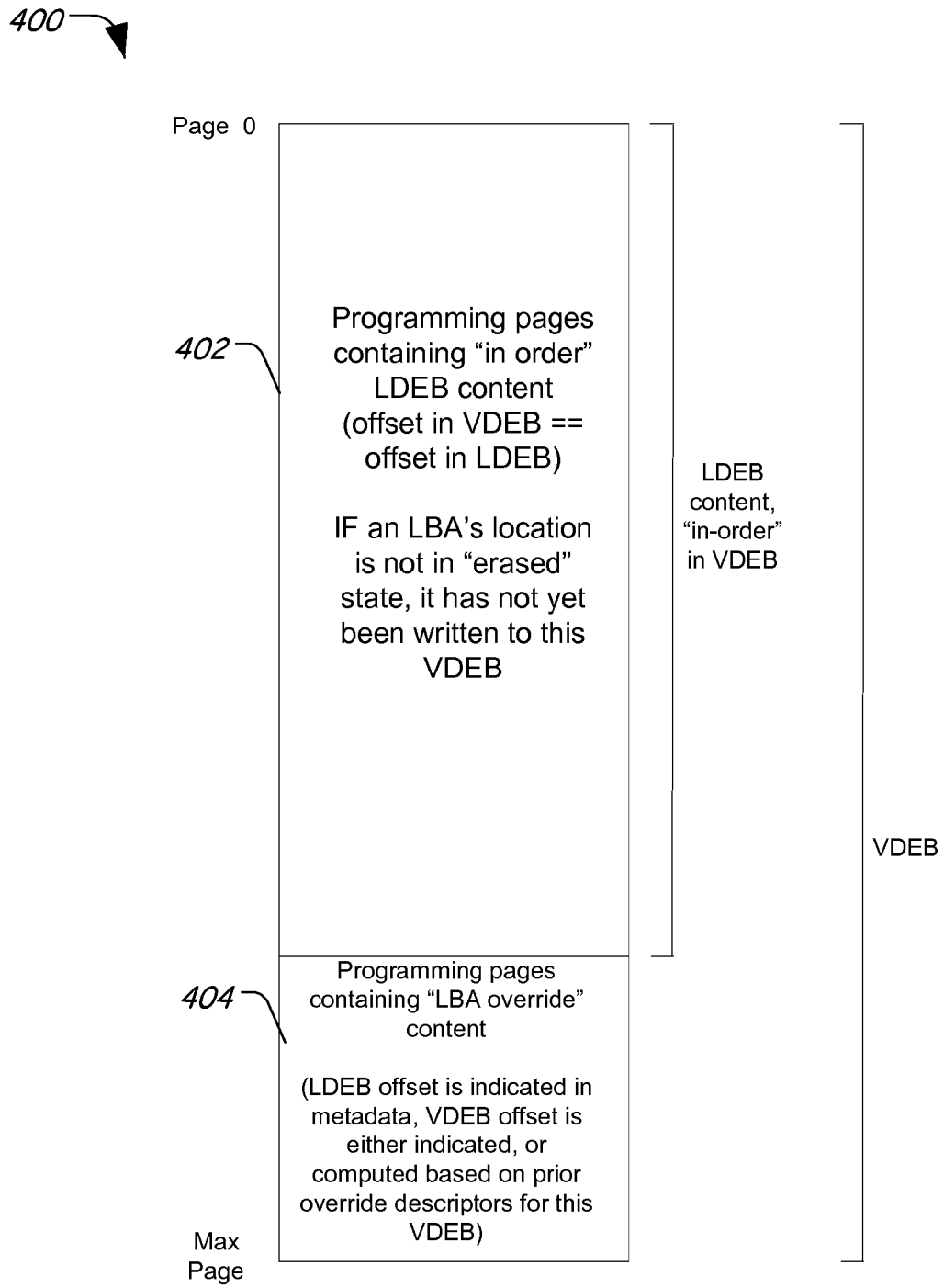
FIG. 4 is a block diagram of a particular illustrative embodiment of a virtual data erasure block.

In a particular embodiment, by distributing received data across the physical space of the media, overall wear due to write/erase operations may be balanced. The distributed media cache being used as LBA override storage may allow each VEB and associated EBs to be written less often than would occur otherwise. Further, metadata needed to track the stored data can be divided by the number of distributed storage locations, thereby reducing the time needed to scan the metadata. In the event of an unexpected power loss, the state of the LEBs within a given VEB may be recovered from override data, from previous copies of the data, and from the metadata. FIG. 4 is a block diagram of a particular illustrative embodiment of a virtual data erasure block 400, including an in-order portion 402 (also referred to as a user data portion or host data portion) and including LBA override portion 404. In a particular embodiment, a virtual dual erasure block (VDEB) corresponds to logical dual erasure block (LDEB). In such an arrangement, the EBs may be hard-wired together in pairs where one holds the lower byte of every 16 bits and the other holds the upper byte of every 16 bits.

The in-order portion 402 can include "in order" LDEB content. The LBA override portion 404 can include programming pages having LBA override data. Once a VDEB address is found in the LDEB-to-VDEB table, then the location of the data in the VDEB is the same as that in the LDEB, unless there has been an override in that VDEB for that LBA. In a particular embodiment, the VDEB offset can be indicated in metadata for a given erasure block or calculated based on prior override descriptors for the particular VDEB.

In a particular embodiment, if the write data from the host system that is destined for an LEB is larger than the override portion 404 of the VEB 400, the data from the LEB can be copied to a new VEB, with the new host data replacing the desired data in the new VEB's "in order" portion 402. However, the pooled media cache makes it possible for data to be held out of a main data store long enough to coalesce the new data with immediately preceding data or succeeding data, allowing two "medium sized" writes to be replaced by one larger write, thereby eliminating one of the erasure block copies (which would have then forced an extra erasure in a solid-state data storage device). Alternatively, in a data storage device with a disc data storage medium, the data may be coalesced to allow for sequential storage at adjacent sectors of the disc data storage medium, which may reduce seek/settle time between adjacent write operations.

Further, in a particular embodiment, while current flash specifications indicate that write failure is a sufficient reason to retire an entire EB, the availability of an override region within the VEB allows a page to be unwritable without having to retire the entire EB. In the event that a higher-level cache is unavailable, the "in order" portion 402 of the VEB can be completed with a copy from the original EB, so that a valid override can be applied. In a storage device that includes a non-volatile (NV) RAM or other higher-level memory designated for caching, a failed page's data can be preserved to allow potential follow-on sequential writing by the host system to coalesce into the new VEB. The failed page's data can then be inserted into the override space of the new VEB.

In another particular embodiment, the override portion 404 can be used to store compressed versions of updates to LBAs that map to the LDEB. Since the override portion 404 is more flexible with respect to length than a block of a traditional hard disc drive, the LBAs can be updated in a highly compressed form. In a particular example, the data storage device uses mapped regions to store some or all of the "non-override" data. In this particular instance, if the first data written to every LBA in the subdivided region were to contain nearly the same data, the controller of the data storage device can store that information in the form of some "base data" (such as the first LBA's data), and then store only the differences between that data and each subsequent LBA, allowing significant compression.

Figure 5:
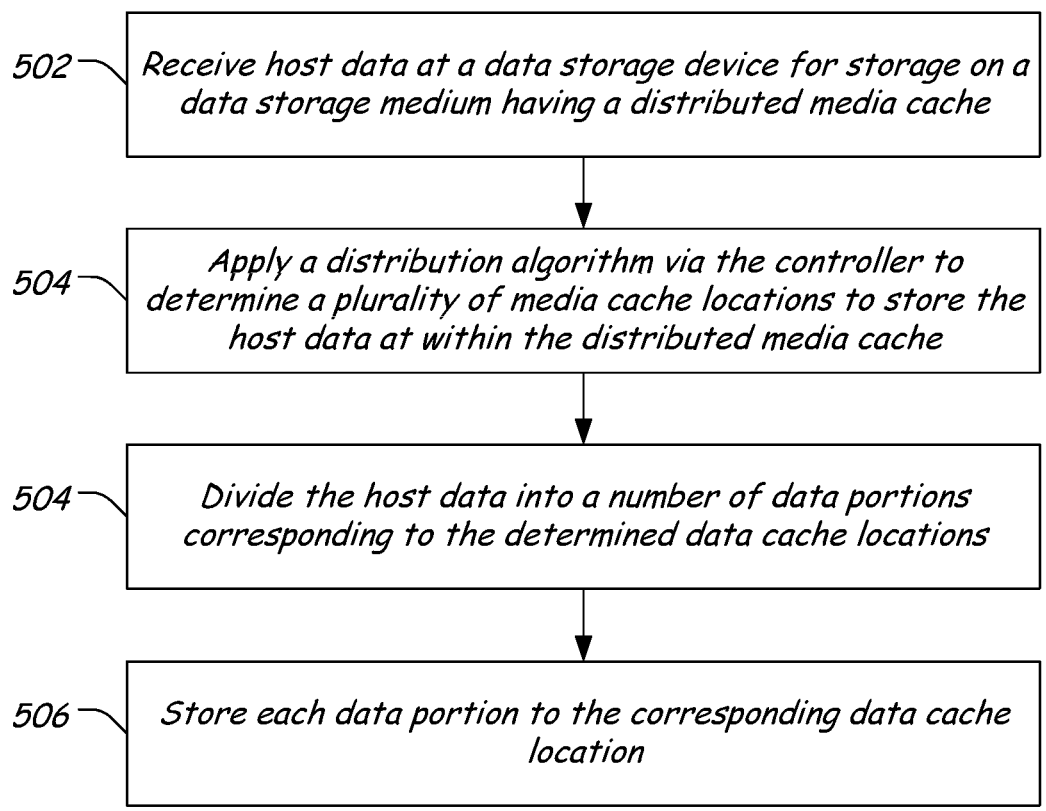
FIG. 5 is a flow diagram of a particular illustrative embodiment of a method of a distributed media cache for a particular data storage system.

FIG. 5 is a flow diagram of a particular illustrative embodiment of a method of a distributed media cache for a particular data storage system. Host data may be received at a data storage device for storage on a data storage medium having a distributed media cache, at 502. In a particular embodiment, a portion of a main data store may be allocated as a distributed media cache. In some embodiments, the distributed media cache may be distributed evenly over multiple physical areas of a data storage medium. In another embodiment, the distributed media cache may be distributed unevenly over multiple physical areas of a data storage medium, which may be based on characteristics of the data storage medium. Also, this may be based on host workload characteristics, which may change the distributed media cache to be allocated to different portions of the distributed media cache.

Once the host data is received, the data storage device controller may apply a distribution algorithm to determine a plurality of media cache locations to store the host data at within the distributed media cache, at 504. In a particular embodiment, the distributed media cache may allow data intended for an arbitrary LBA to be stored in any of the distributed media caches, without regard to location of the LBA or the media cache. In another embodiment, the distributed media cache may allow data intended for a designated LBA to only be cached in a specific one of the distributed media caches associated with the physical address assigned to the designated LBA.

Once the distributed media cache locations are determined, the data storage device controller may divide the host data into a number of portions corresponding to the determined data cache locations, at 506. Then, each data portion is stored to the corresponding distributed data cache location, at 508.

In some embodiments, the data storage device controller may determine to store the host data to the main store, or another VDEB, rather than within one of the distributed media caches. For example, this may occur when a particular media cache is full or when the host data to be written to that particular media cache is too large for the media cache.

In conjunction with the systems and methods disclosed above with respect to FIGS. 1-8, a data storage device is disclosed that includes a distributed media cache. In a particular embodiment, the data storage device may be a hybrid data storage device having a disc data storage medium, at least one solid-state data storage medium, such as Flash memory, and a distributed media cache. In another particular embodiment, the data storage device can include multiple solid-state data storage media having a distributed media cache where the media cache may be distributed across physical aspects of each data storage media and across the data storage media themselves.

The data storage device may be adapted to selectively refresh the stored data. If specific logical erasure block data is identified as "difficult to recover" (for example, associated read errors exceed an error correction code (ECC) threshold), an override entry of the VEB can be used to store a fresh copy of the specific data sectors that suffered degradation in their current location. Read operations (even background read operations) as well as write operations can be used as triggers for writing data to the override area.

It is to be understood that even though numerous characteristics and advantages of various embodiments have been set forth in the foregoing description, together with details of the structure and function of the various embodiments, this disclosure is illustrative only, and changes may be made in detail, especially in matters of structure and arrangement of parts. For example, the embodiments described herein can be implemented on any type of data storage device, such as a solid-state memory device, a disc drive, or a hybrid device. Also, the particular elements may vary depending on the particular application for the data storage system while maintaining substantially the same functionality without departing from the scope and spirit of the present disclosure. In addition, although an embodiment described herein is directed to a hybrid data storage system including a disc data storage medium and at least one solid-state data storage medium and having a distributed media cache, it will be appreciated by those skilled in the art that the teachings of the present application can be applied to any type of data storage device that may benefit from the ideas, structure, or functionality disclosed herein.

What is claimed is:

1. A data storage device comprising:
multiple nonvolatile solid state data storage mediums, each nonvolatile solid state data storage medium including flash memory having multiple erasure blocks, each of the multiple erasure blocks including a physically separate cache portion reserved as cache storage and a main portion reserved as main storage; and
a controller adapted to:
access the main portion of each of the erasure blocks as main storage having specific logical block addresses assigned thereto;
access the physically separate cache portion of each of the erasure blocks as cache storage; and
selectively store data received from a host system intended for a designated logical block address (LBA) of a main portion into a specific one of the physically separate cache portions only when the data intended for the designated LBA is already associated with a particular erasure block in which the specific one of the physically separate cache portions is located.

2. The data storage device of claim 1, wherein the controller only allows storage of the data to a first of the physically separate cache portions when the data has a logical block address within a range of logical block addresses associated with the first physically separate cache portion.

3. The data storage device of claim 1 wherein the controller is adapted to create a virtual erasure block including a main storage portion of an erasure block and at least one of the physically separate cache portions.

4. The data storage device of claim 1 further comprising the physically separate cache portions are distributed evenly over each of the erasure blocks.

5. The data storage device of claim 1 further comprising each erasure block includes a same percentage reserved as cache data storage locations.

6. The data storage device of claim 1 further comprising the controller adapted to store data intended for non-sequential physical addresses of one or more of the multiple nonvolatile data storage mediums to sequential physical addresses of the physically separate cache portions.

7. The device of claim 1 further comprising the physically separate cache portion is a first number of pages of each erasure block and the main portions are a second number of pages of each erasure block.

8. The device of claim 7 further comprising the first number of pages and the second number of pages are variable per erasure block of the multiple erasure blocks.

\* \* \* \* \*